US011878396B2

(12) United States Patent
Sawano et al.

(10) Patent No.: US 11,878,396 B2
(45) Date of Patent: Jan. 23, 2024

(54) IMPACT ROTARY TOOL

(71) Applicant: Panasonic Holdings Corporation, Osaka (JP)

(72) Inventors: Fumiaki Sawano, Mie (JP); Hiroaki Murakami, Mie (JP); Motoharu Muto, Mie (JP); Masanori Nakamoto, Mie (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 0 days.

(21) Appl. No.: 17/989,392

(22) Filed: Nov. 17, 2022

(65) Prior Publication Data

US 2023/0158648 A1 May 25, 2023

(30) Foreign Application Priority Data

Nov. 19, 2021 (JP) ................................. 2021-188797

(51) Int. Cl.
*B25B 21/00* (2006.01)
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC ............................ B25B 21/02; B25B 23/1475
See application file for complete search history.

(56) References Cited

U.S. PATENT DOCUMENTS

2019/0022836 A1* 1/2019 Chu ...................... G01L 25/003
2019/0030696 A1* 1/2019 Seith ....................... B25B 21/02
2020/0161994 A1* 5/2020 Ni ........................... H02P 6/153
2020/0230789 A1* 7/2020 Dey, IV .............. B25B 23/1475
2021/0379743 A1* 12/2021 Schneider .............. G01D 5/204

FOREIGN PATENT DOCUMENTS

| | | | | |
|---|---|---|---|---|
| EP | 0502748 A1 | 9/1992 | | |
| EP | 2459348 A1 | 6/2012 | | |
| JP | 2015-223658 A | 12/2015 | | |
| JP | 2018-047530 A | 3/2018 | | |
| JP | 2021-070108 A | 5/2021 | | |
| WO | WO-2011013854 A1 * | 2/2011 | ............. | B25B 21/02 |

OTHER PUBLICATIONS

Extended European Search Report issued in corresponding European Patent Application No. 22206884.3, dated Apr. 19, 2023.

* cited by examiner

*Primary Examiner* — Eyamindae C Jallow
(74) *Attorney, Agent, or Firm* — Rimon, P.C.

(57) ABSTRACT

An impact rotary tool includes a motor, a hammer, an anvil, a sensor, a circuit board, and an isolator. The hammer is configured to receive rotational force around an axis from the motor and output striking rotational force which is obtained by converting part of the rotational force into striking force around the axis. The anvil to which a tip tool is to be attached is configured to rotate, together with the tip tool, around the axis in response to the striking rotational force received from the hammer. The sensor is disposed in a vicinity of the anvil and is configured to sense a change in a state of the anvil, the change being according to the striking rotational force. The circuit board is configured to receive a sensing result by the sensor. The isolator isolates contact portions of the hammer and the anvil from at least the circuit board.

6 Claims, 7 Drawing Sheets

IMPACT ROTARY TOOL

CROSS-REFERENCE TO RELATED APPLICATION

The present application is based upon and claims the benefit of priority to Japanese Patent Application No. 2021-188797, filed on Nov. 19, 2011, the entire contents of which are incorporated herein by reference.

TECHNICAL FIELD

The present disclosure relates to impact rotary tools, and specifically, to an impact rotary tool including a hammer, an anvil, a sensor disposed in the vicinity of the anvil, and a circuit board to which an output of the sensor is given.

BACKGROUND ART

JP 2021-070108 A (Literature 1) discloses an electric tool including a motor, an impact mechanism (hammer), an output shaft (anvil), a torque measuring unit (sensor), a tightening torque computing unit, and a controller (circuit board). The impact mechanism receives rotational force from the motor and applies, to the output shaft, impact force obtained by converting part of the rotational force into pulsed rotational force. The torque measuring unit measures torque applied to the output shaft with reference to a strain of the output shaft caused by the impact force. The tightening torque computing unit computes tightening torque applied to a tightening member from the output shaft via a tip tool with reference to the torque thus measured. The controller controls the motor in accordance with the tightening torque thus computed.

In an impact rotary tool having a configuration as described above, striking force (an impact) produces abrasion powder generally at contact portions between the hammer and the anvil. Adhesion of conductive abrasion powder to the circuit board may make a non-conductive part conductive, which may destabilize operation of the impact rotary tool.

In the electric tool described in Literature 1, the tightening torque computing unit and other elements are housed in a case, thereby achieving a certain degree of suppression of the adhesive powder from adhering to the tightening torque computing unit and other elements, but further suppression is still required.

SUMMARY

An object of the present disclosure is to provide an impact rotary tool in which abrasion powder produced between a hammer and an anvil is suppressed from adhering to a circuit board.

An impact rotary tool according to an aspect of the present disclosure includes a motor, a hammer, an anvil, a sensor, a circuit board, and an isolator. The hammer is configured to receive rotational force around an axis from the motor and output striking rotational force. The striking rotational force is obtained by converting part of the rotational force into impact force around the axis. The anvil to which a tip tool is to be attached is configured to rotate, together with the tip tool, around the axis in response to the striking rotational force received from the hammer. The sensor is disposed in a vicinity of the anvil and is configured to sense a change in a state of the anvil, the change being according to the striking rotational force. The circuit board is configured to receive a sensing result by the sensor. The isolator is configured to isolate contact portions of the hammer and the anvil from at least the circuit board.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Figure 1:
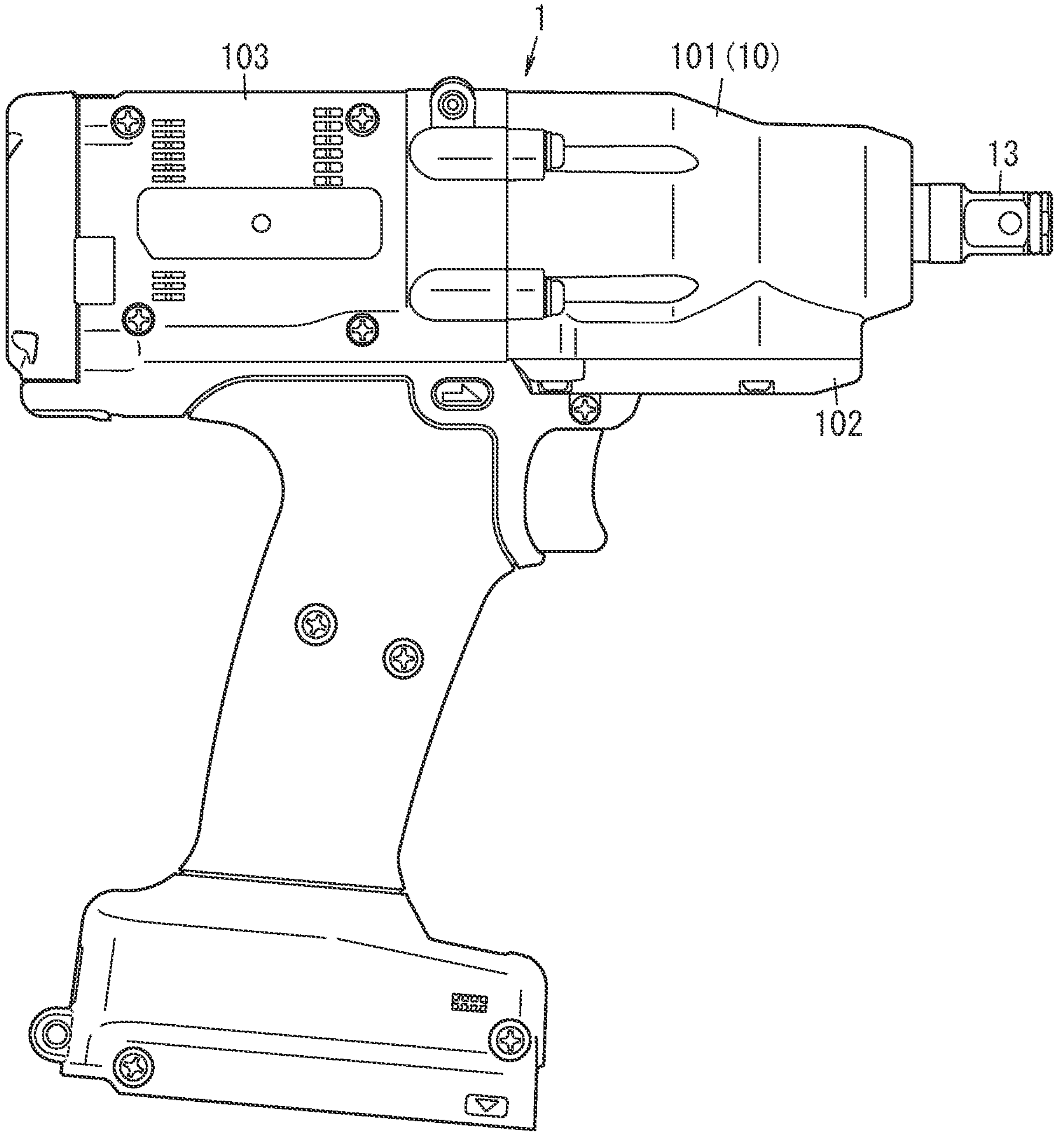
FIG. 1 is an external view of an impact rotary tool according to an embodiment of the present disclosure.

Figures described in the following embodiment are schematic views, and the ratio of sizes and the ratio of thicknesses of components do not necessarily reflect actual dimensional ratios. Note that a configuration described in the following embodiment is a mere example of the present disclosure. The present disclosure is not limited to the following embodiment, and various modifications may be made based on design and the like as long as the effect of the present disclosure is achieved.

(1) Overview

As shown in FIGS. 1 to 4 and FIG. 7A, an impact rotary tool 1 according to the embodiment of the present disclosure includes a motor 11, a hammer 12, an anvil 13, a sensor 14, a circuit board 15, and an isolator 10.

(1-1) Motor, Hammer, and Anvil

The motor 11 is supplied with electric power from a battery 16 (described later) and generates rotational force around an axis 200. The hammer 12 receives the rotational force around the axis 200 from the motor 11 and outputs striking rotational force. The striking rotational force is force (impact rotational force) obtained by converting part of the rotational force from the motor 11 into striking force (pulse-like impact force) around the axis 200. The anvil 13 to which a tip tool 2 is attached rotates, together with the tip tool 2, around the axis 200 in response to the striking rotational force received from the hammer 12.

(1-2) Sensor

The sensor 14 is disposed in the vicinity of the anvil 13 and senses a change in a state of the anvil 13, the change being according to the striking rotational force generated by the hammer 12.

In the present embodiment, the sensor 14 is a magnetostrictive sensor. The magnetostrictive sensor is a sensor configured to magnetically sense the strain of an object (in the present embodiment, the anvil 13), which will be described in detail later.

The sensor 14 may, however, be a strain sensor (e.g., a strain gauge configured to electrically sense a strain) other than the magnetostrictive sensor. The sensor 14 may be a sensor (e.g., an acceleration sensor) other than the strain sensor.

In the present embodiment, the change in the state to be sensed is a change in the strain of the anvil 13. Alternatively, the change in the state may be a change (e.g., a change in angular velocity of the anvil 13 around the axis 200) other than the strain.

(1-3) Circuit Board

The circuit board 15 receives a sensing result by the sensor 14.

In the embodiment, the sensor 14 and the circuit board 15 are electrically connected to each other via a lead line 14*c*. Alternatively, the sensor 14 and the circuit board 15 may be connected to each other such that near field communication, for example, is possible therebetween.

The circuit board 15 in the present embodiment includes an amplifying circuit 15*a* and a processing circuit 15*b*. The amplifying circuit 15*a* amplifies a signal (e.g., a voltage signal from a coil included in the magnetostrictive sensor) indicating the sensing result by the sensor 14. The processing circuit 15*b* performs processing (e.g., conversion into a strain signal and computation to determine tightening torque with reference to the strain) of the voltage signal amplified by the amplifying circuit 15*a*.

Note that amplification of the voltage signal and the conversion of the voltage signal thus amplified into the strain signal may be performed in the sensor 14, and the circuit board 15 may perform only the computation to determine the tightening torque with reference to the strain.

(1-4) Isolator

The isolator 10 isolates contact portions of the hammer 12 and the anvil 13 from at least the circuit board 15.

The contact portions of the hammer 12 and the anvil 13 are: a portion which is part of the anvil 13 and on which the striking rotational force from the hammer 12 acts; and a portion which is part of the hammer 12 and on which reaction force from the anvil 13 acts.

The portion, on which the striking rotational force from the hammer 12 acts, of the anvil 13 is an end (a rear end: e.g., an anvil claw 13*b*) on an opposite side from an end (a tip end 13*a*) to which the tip tool 2 is to be attached. The portion, on which the reaction force from the anvil 13 acts, of the hammer 12 is a portion in contact with the rear end of the anvil 13 (e.g., the hammer claw 12*a* to be fitted to the anvil claw 13*b*).

That is, the contact portions of the hammer 12 and the anvil 13 are, for example, the hammer claw 12*a* and the anvil claw 13*b* and are hereinafter referred to as contact portions (12*a* and 13*b*).

In this way, isolating the contact portions (12*a* and 13*b*), which are sources of abrasive powder, from the circuit board 15 by the isolator 10 enables the abrasive powder to be suppressed from adhering to the circuit board 15.

(1-4-1) Housing

In the present embodiment, the isolator 10 is a housing 101. As used herein, the housing 101 is a member which covers at least the contact portions (12*a* and 13*b*). The circuit board 15 is disposed outside the housing 101.

In other words, the housing 101 encloses only a space (hereinafter referred to as a first space S1) in which the contact portions (12*a* and 13*b*) are present, but the housing 101 does not enclose a space (hereinafter referred to as a second space S2) in which the circuit board 15 is present. Thus, the contact portions (12*a* and 13*b*) are isolated from at least the circuit board 15.

In this way, covering the sources of the abrasive powder with the housing 101 to confine the abrasive powder in the housing 101 enables the abrasive powder to be suppressed from adhering to the circuit board 15 disposed outside the housing 101.

In the impact rotary tool 1, usually, the motor 11 is also disposed outside the housing 101. The impact rotary tool 1 in the present embodiment further includes a battery 16, a control circuit 17, and a wireless communication circuit 18 (described later), and these elements are also disposed outside the housing 101.

In other words, the housing 101 encloses only the first space S1, does not enclose the second space S2, and does not enclose a space (hereinafter referred to as a third space S3) in which the motor 11 is present. In the third space S3 in the present embodiment, the battery 16, the control circuit 17, and the wireless communication circuit 18 are further present.

Thus, the contact portions (12*a* and 13*b*) are isolated not only from the circuit board 15 but also from the motor 11, the battery 16, the control circuit 17, the wireless communication circuit 18, and other elements.

In the present embodiment, covering the contact portions (12*a*, 13*b*), which are the sources of the abrasive powder, with the housing 101 (e.g., a first housing 101: described later), which is an aspect of the isolator 10, confines the abrasive powder in the housing 101, which consequently enables the abrasive powder to be suppressed from adhering to the circuit board 15 disposed outside the housing 101.

In the electric tool of Patent Literature 1, the tightening torque computing unit corresponding to the circuit board 15, and other elements are covered with a cover. In this case, however, the effect of suppressing adhesion of abrasive powder spreads only to the tightening torque computing unit and other elements. In contrast, when the sources of the abrasive powder are isolated by being covered with the housing 101 as in the present embodiment, the effect of suppressing adhesion of abrasive powder spreads also to circuits (e.g., the control circuit 17 and the wireless communication circuit 18) in addition to the circuit board 15.

(1-4-2) Wall

The isolator 10 may be a wall 10*a*. As used herein, the wall 10*a* is a member (see FIG. 7C) which separates a space (hereinafter referred to as a fourth space S4) in which the contact portions (12*a* and 13*b*) and the processing circuit 15*b* are present into the first space S1 in which the contact portions (12*a* and 13*b*) are present and the second space S2 in which the processing circuit 15*b* is present. Note that the wall 10*a* will be described in a second variation.

In this case, isolating the contact portions (12*a* and 13*b*) from the circuit board 15 by the wall 10*a*, which is another aspect of the isolator 10, enables the abrasive powder to be suppressed from adhering to the circuit board 15.

(2) Details

Figure 2:
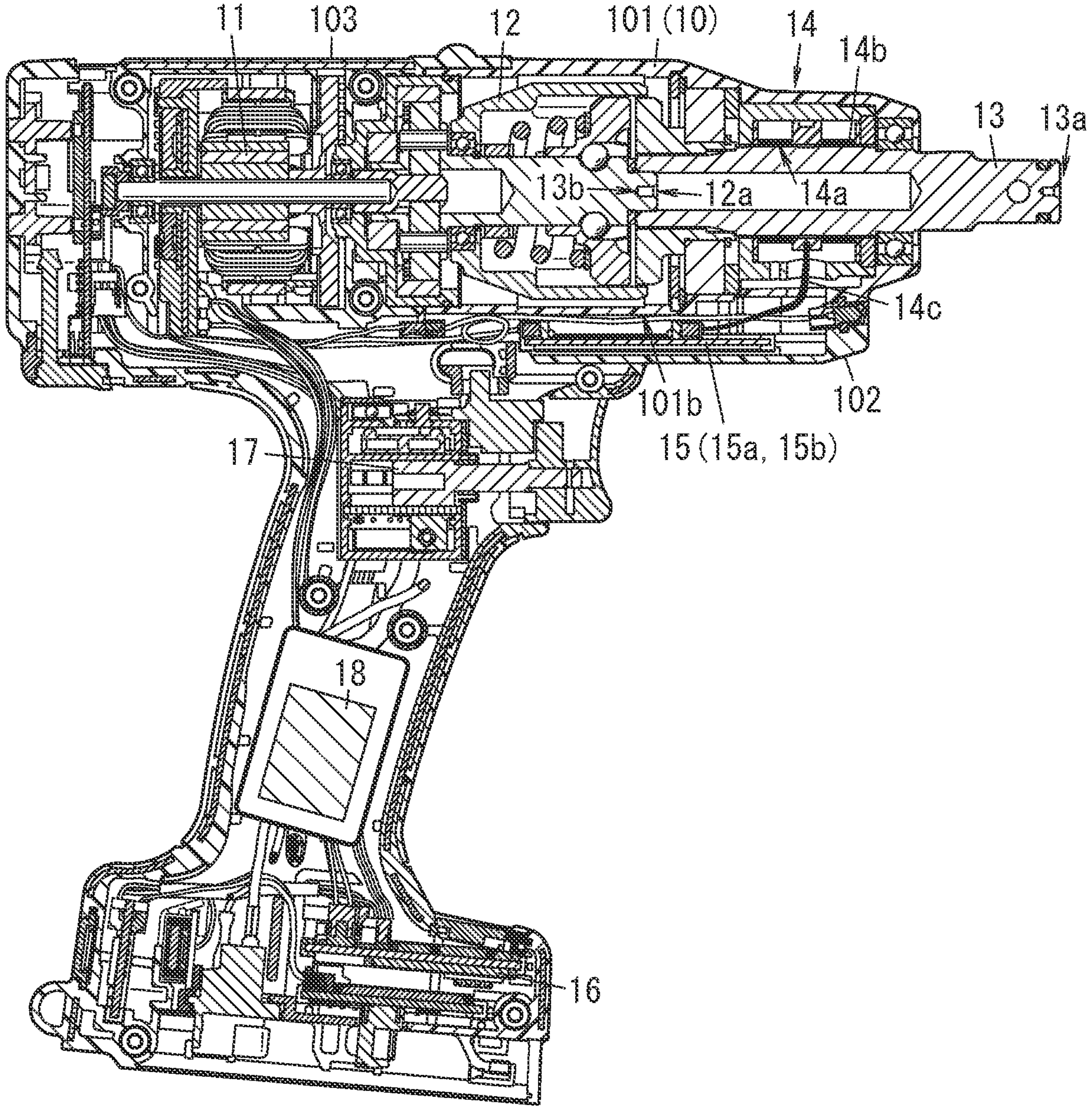
FIG. 2 is a sectional view of the impact rotary tool.
Figure 3:
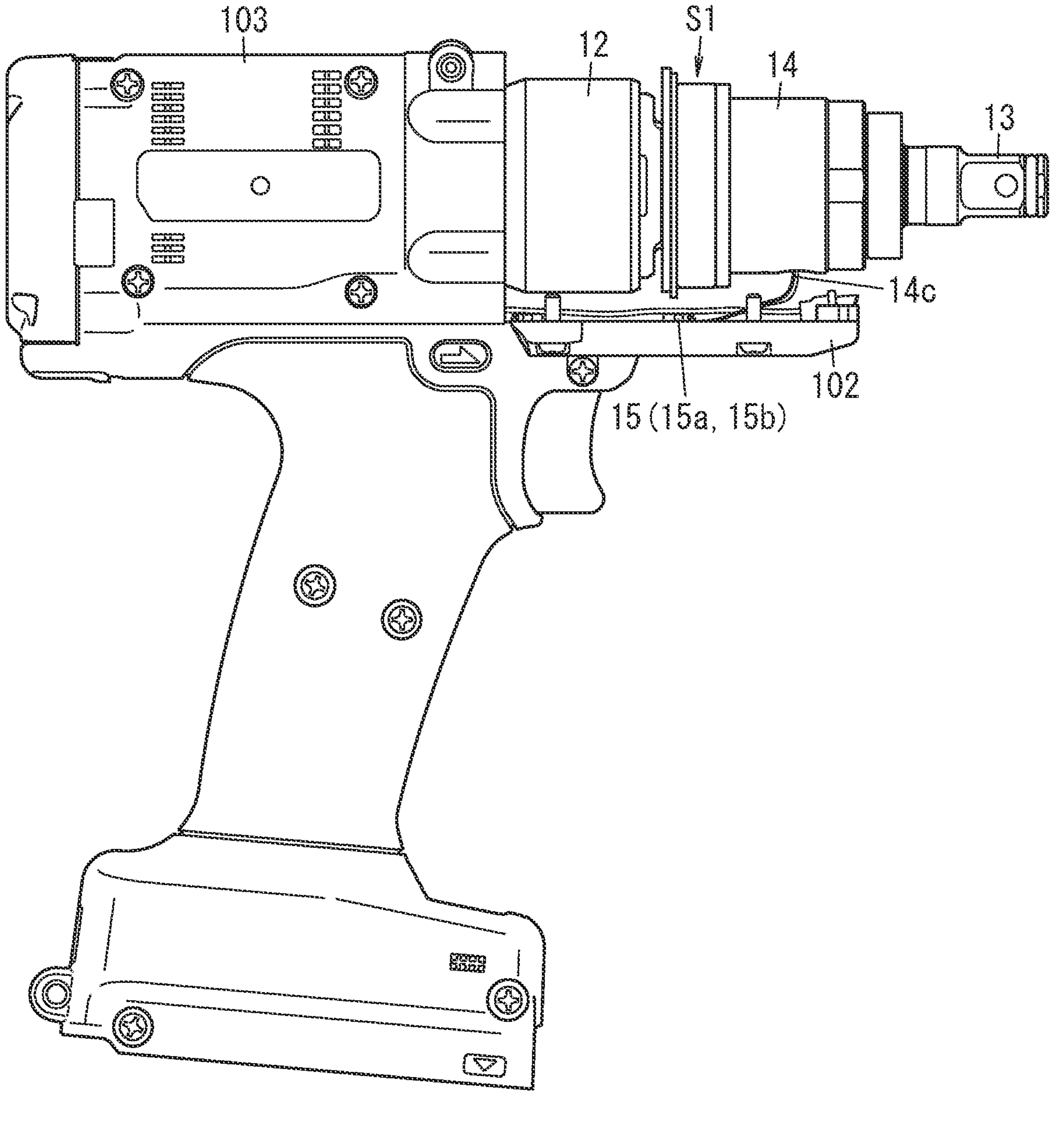
FIG. 3 is a side view of the impact rotary tool with a first housing being removed.
Figure 6:
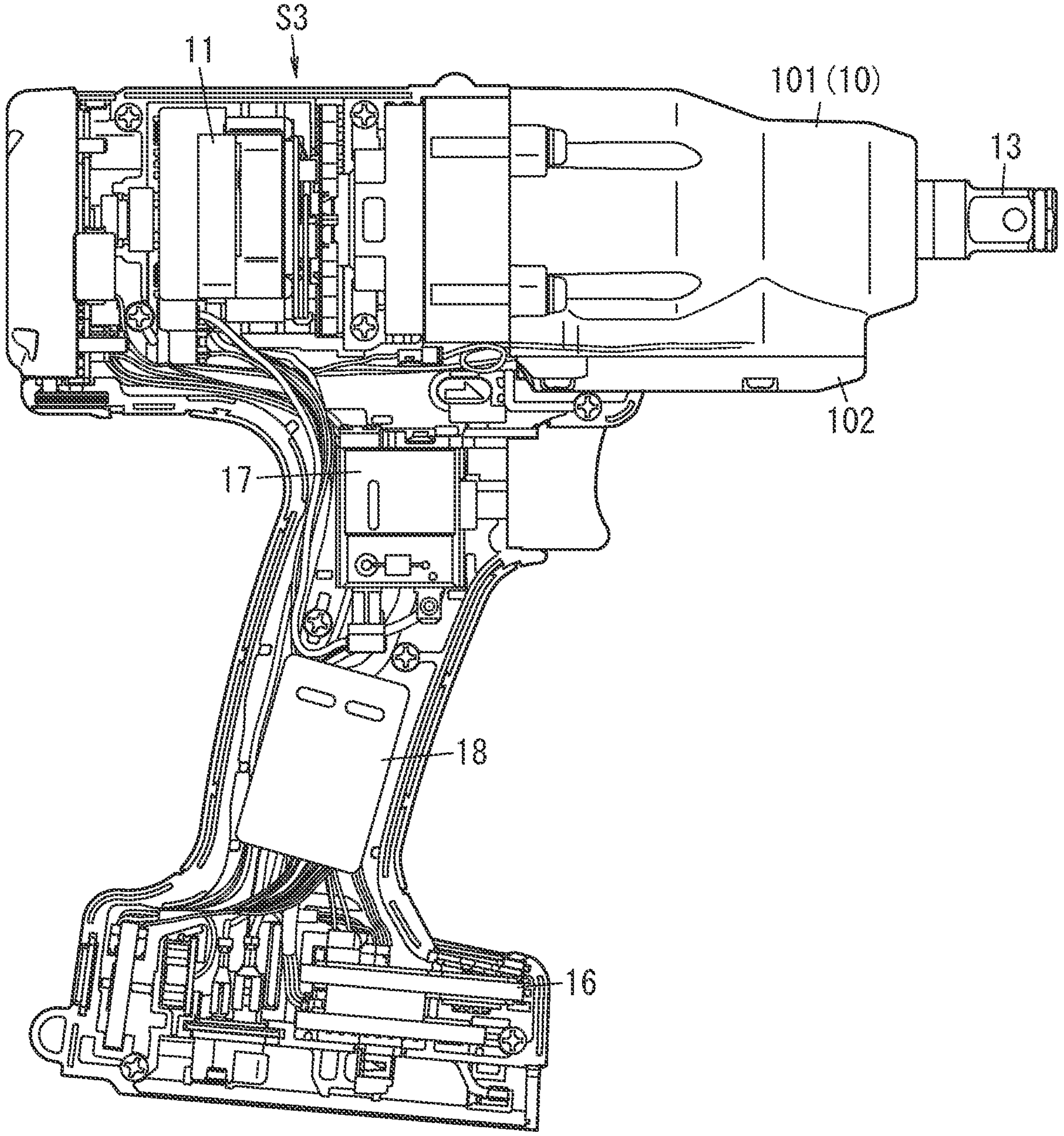
FIG. 6 is a side view of the impact rotary tool with a third housing being removed.

The impact rotary tool 1 further includes the battery 16, the control circuit 17, and the wireless communication circuit 18 as shown in FIGS. 2 and 6 in addition to the six elements (10 to 15) described above.

The battery 16 supplies electric power to the motor 11. The control circuit 17 controls the motor 11 with reference to, for example, a processing result by the processing circuit 15*b*. The wireless communication circuit 18 wirelessly communicates with an external device (not shown).

The isolator 10 in the present embodiment is the housing 101 and is specifically the first housing 101.

(2-1) First Housing

The first housing 101 at least covers the contact portions (12*a* and 13*b*) between the hammer 12 and the anvil 13. The circuit board 15 is disposed outside the first housing 101. The circuit board 15 in the present embodiment is disposed inside a second housing 102 (described later) but is not limited to this example.

The first housing 101 encloses only the first space S1 in which the contact portions (12*a* and 13*b*) are present and does not enclose the second space S2 in which the circuit board 15 is present.

Figure 7A:
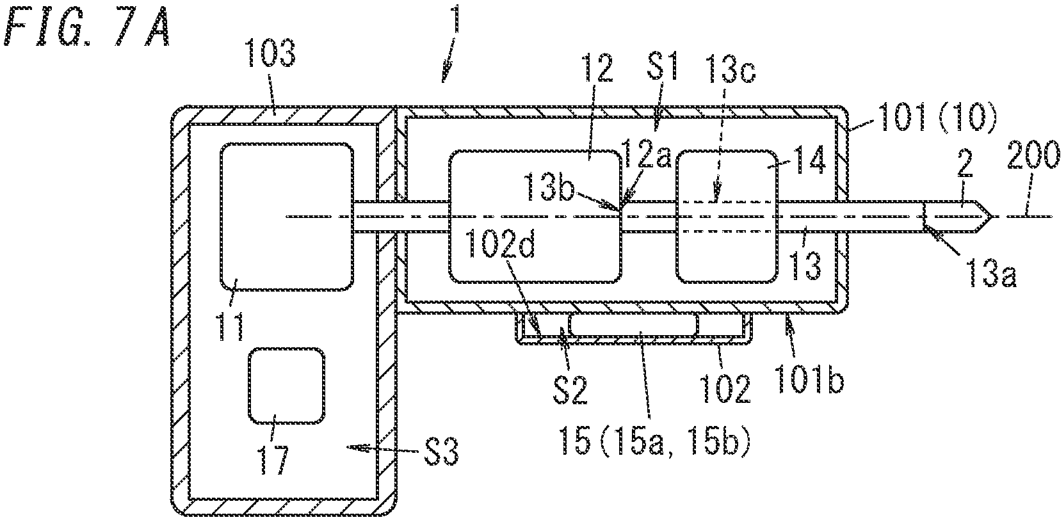
FIG. 7A is a schematic diagram of the impact rotary tool.

In the impact rotary tool 1 of the present embodiment, the hammer 12, part of the anvil 13 except for the tip end 13*a* to which the tip tool 2 is to be attached, and the sensor 14 are present in the first space S1 as shown in, for example, FIGS. 2 and 7A. Thus, the hammer 12, most part of the anvil 13, and the sensor 14 are covered with the first housing 101. It is noted that, although the hammer 12 is entirely covered with the first housing 101 in FIG. 2, only a part thereof may be covered with the first housing 101.

Thus, covering most parts of the hammer 12 and the anvil 13 which are the sources of the abrasive powder, and the sensor 14 in the vicinity of the anvil 13 with the first housing 101 enables the abrasive powder to be suppressed from adhering to the circuit board 15 disposed outside the housing 101 while protecting the hammer 12, the anvil 13, and the sensor 14.

(2-2) Second Housing

Figure 4:
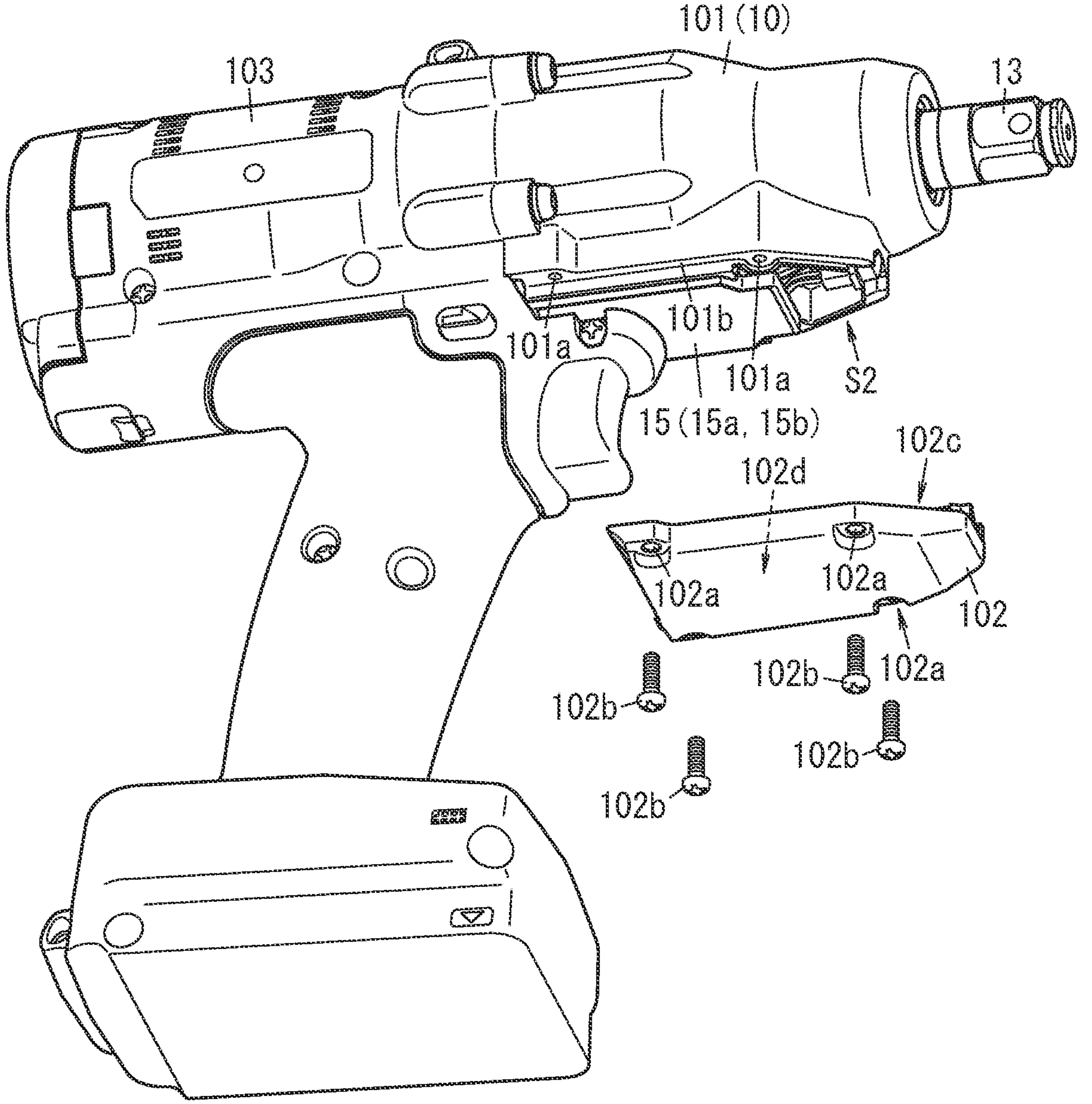
FIG. 4 is an exploded perspective view of the impact rotary tool with a second housing being removed.

The impact rotary tool 1 further includes the second housing 102 as shown in, for example, FIGS. 1 and 4. The second housing 102 is disposed outside the first housing 101 and covers the circuit board 15.

The second housing 102 encloses the second space S2 in which the circuit board 15 is present. In the present embodiment, in the second space S2, only the circuit board 15 is present, but other members may be present in addition to the circuit board 15.

As shown in, for example, FIGS. 4 and 7A, the second housing 102 in the present embodiment has one main surface 102*c* which is open. The second housing 102 is, at the side of the one main surface 102*c* which is open, fixed to an outer surface 101*b* of the first housing 101 with the circuit board 15 being housed therein.

Specifically, the impact rotary tool 1 further includes four screws 102*b* as shown in FIG. 4, the outer surface 101*b* of the first housing 101 has four screw holes 101*a* formed therein, and the second housing 102 has four through holes 102*a* formed therein.

As shown in, for example, FIG. 2, the circuit board 15 is disposed on the outer surface 101*b* of the first housing 101 and is connected to the sensor 14 in the first housing 101 via the lead line 14*c*.

The four screws 102*b* are inserted through the four through holes 102*a* of the second housing 102 and are tightened into the four screw holes 101*a* formed in the outer surface 101*b* of the first housing 101. In this way, the second housing 102 is, at the side of the one main surface 102*c* which is open, fixed to the outer surface 101*b* of the first housing 101.

In the present embodiment, the four screws 102*b* enables the second housing 102 to be attached to and detached from the outer surface 101*b* of the first housing 101. Alternatively, the second housing 102 may be fixed to the outer surface 101*b* of the first housing 101 with an adhesive or the like.

In the present embodiment, in addition to covering the most parts of the hammer 12 and the anvil 13, and the sensor 14 in the vicinity of the anvil 13 with the first housing 101, covering the circuit board 15 with the second housing 102 as described above enables the abrasive powder to be more effectively suppressed from adhering to the circuit board 15.

Note that the one main surface 102*c* of the second housing 102 does not have to be open (see first variation). Moreover, the second housing 102 may further cover the first housing 101 in addition to the circuit board 15 (see other variations).

(2-3) Circuit Board (2-3-1) Disposition of Circuit Board

The circuit board 15 is fixed to the outer surface 101*b* of the first housing 101.

The circuit board 15 is fixed to the outer surface 101*b* of the first housing 101 by, for example, the second housing 102.

As described above, the one main surface 102*c* of the second housing 102 in the present embodiment is open, and the circuit board 15 is directly fixed to the outer surface 101*b* of the first housing 101 while the circuit board 15 is housed in the second housing 102 as shown in, for example, FIGS. 4 and 7A.

Specifically, the circuit board 15 is disposed on the outer surface 101*b* of the first housing 101, and the second housing 102 is fixed, at the one main surface 102*c* which is open, to the outer surface 101*b* of the first housing 101 such that the second housing 102 covers the circuit board 15. That is, the circuit board 15 is sandwiched between the outer surface 101*b* of the first housing 101 and an inner surface 102*d* of the second housing 102, thereby being fixed to the outer surface 101*b* of the first housing 101.

Therefore, the second housing 102 of the present embodiment enables the circuit board 15 to be directly fixed to the first housing 101 and the abrasive powder to be suppressed from adhering to the circuit board 15.

Further, fixing the circuit board 15 to the outer surface 101*b* of the housing 101 enables the distance between the sensor 14 and the circuit board 15 to be shortened. In the present embodiment, the sensor 14 and the circuit board 15 are connected to each other via the lead line 14*c*, and the length of the lead line 14*c* is thus shortened.

Furthermore, fixing the circuit board 15 to the outer surface 101*b* of the first housing 101 results in that the sensor 14 in the first housing 101 and the circuit board 15 on the outer surface 101*b* of the first housing 101 vibrate together with the first housing 101 in response to the striking rotational force from the hammer 12, which enables tension to be suppressed from being caused at the lead line 14*c*.

The connection between the sensor 14 and the circuit board 15 is not limited to a wired connection via the lead line 14*c* but may be a wireless connection. In this case, the wireless communication distance is shortened.

(2-3-2) Configuration of Circuit Board

The circuit board 15 includes a processing circuit 15*b*. The processing circuit 15*b* processes the sensing result by the sensor 14.

The sensor 14 in the present embodiment is a magnetostrictive sensor as described above, and the processing circuit 15*b* processes a voltage signal from a coil 14*b* (described later) included in the magnetostrictive sensor.

The circuit board 15 in the present embodiment further includes an amplifying circuit 15*a*. The amplifying circuit 15*a* amplifies the voltage signal from the coil 14*b* and gives the voltage signal thus amplified to the processing circuit 15*b*. The processing circuit 15*b* processes the voltage signal thus amplified by the amplifying circuit 15*a*.

Specifically, the processing circuit 15*b* converts the voltage signal thus amplified into a strain signal that varies in accordance with the strain.

In this way, amplifying the voltage signal from the coil 14*b* included in the magnetostrictive sensor 14 by the circuit board 15 and then converting the voltage signal into the strain signal enable the strain of the anvil 13 to be magnetically sensed.

Furthermore, the processing circuit 15*b* performs computation to determine the tightening torque with reference to the strain indicated by the strain signal. The tightening torque is torque which is produced around the axis 200 and which is applied to the tightening member such as a screw via the tip tool 2 from the anvil 13.

The processing result by the processing circuit 15*b* is given to the control circuit 17. A connection between the processing circuit 15*b* and the control circuit 17 is also usually a wired connection but may be a wireless connection.

(2-4) Third Housing

The impact rotary tool 1 further includes a third housing 103.

The third housing 103 is disposed outside the first housing 101 and outside the second housing 102 and covers at least the motor 11.

The third housing 103 in the present embodiment encloses the third space S3 in which the motor 11 and other elements are present. In the impact rotary tool 1, the battery 16, the control circuit 17, the wireless communication circuit 18, and other elements are also present in the third space S3 as shown in FIG. 2.

Thus, the third housing 103 also covers the battery 16, the control circuit 17, the wireless communication circuit 18, and other elements present in the third space S3.

In this way, covering the motor 11 and other elements with the third housing 103 enables abrasion powder produced at the contact portions (12*a* and 13*b*) of the hammer 12 and the anvil 13 to be suppressed from adhering to the motor 11 and other elements.

Note that depending on the type of the motor 11, friction, for example, between a brush and the a commutator may produce abrasive powder, but covering the motor 11 with the third housing 103 enables such abrasive powder to be suppressed from adhering to the circuit board 15.

The control circuit 17 and the wireless communication circuit 18 are disposed in the third space S3 (in the third housing 103) in the present embodiment, but at least one of the control circuit 17 or the wireless communication circuit 18 may be disposed in the second space S2 (in the second housing 102). That is, both or one of the control circuit 17 and the wireless communication circuit 18 may be an element(s) included in the circuit board 15.

(2-5) Sensor

The sensor 14 in the present embodiment is a magnetostrictive sensor and is hereinafter referred to as a "magnetostrictive sensor 14". The magnetostrictive sensor 14 magnetically senses the strain of the anvil 13 and outputs a signal corresponding to the sensing result.

Figure 5:
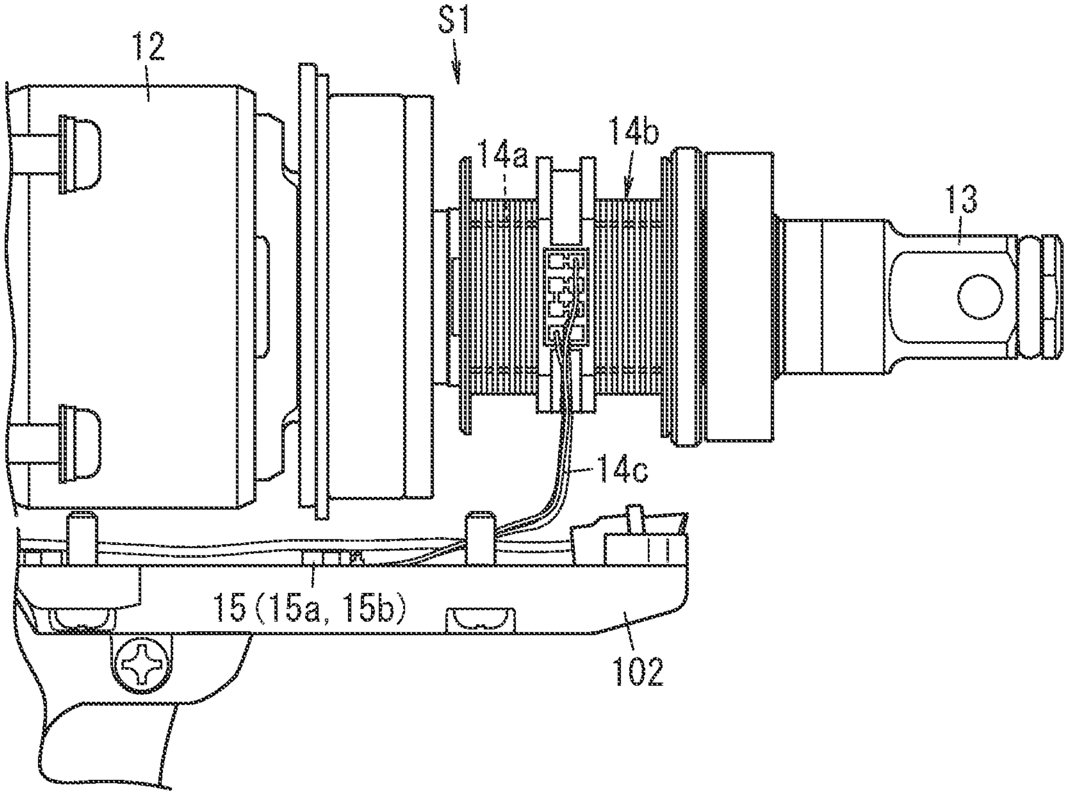
FIG. 5 is a detailed view of the interior of a sensor of the impact rotary tool.

The magnetostrictive sensor 14 includes, for example, a magnetostrictive film 14*a* and the coil 14*b* as shown in FIG. 5. The magnetostrictive film 14*a* is disposed on at least part of an outer peripheral surface 13*c* of the anvil 13, and the coil 14*b* surrounds the magnetostrictive film 14*a*.

In the present embodiment, the magnetostrictive film 14*a* is formed, for example, slightly rearward on the outer peripheral surface 13*c* of the anvil 13 (at the side of the anvil claw 13*b*) over a range of approximately ⅓ to ¼ of the length of the anvil 13 as shown in FIG. 2.

The magnetostrictive film 14*a* is formed by, for example, heat spraying of a magnetostrictive material such as ferrite onto the anvil 13. Note that the type of the magnetic material and the method of forming the magnetostrictive film 14*a* are not particularly limited.

When the anvil 13 receives the striking rotational force from the hammer 12 and thus strains, the anvil 13 applies its stress to the magnetostrictive film 14*a*, thereby changing the magnetic permeability of the magnetostrictive film 14*a*. When the magnetic permeability of the magnetostrictive film 14*a* is changed, the inverse magnetostriction effect changes the impedance of the coil 14*b*. The coil 14*b* outputs a voltage signal according to such an impedance change.

The voltage signal from the coil 14*b* is given to the circuit board 15 as described above, is amplified by the amplifying circuit 15*a*, and is then converted into a strain signal by the processing circuit 15*b*.

In this way, the voltage signal from the coil 14*b* included in the magnetostrictive sensor 14 is amplified and is then converted into the strain signal by the circuit board 15, which enables the strain of the anvil 13 to be magnetically sensed.

Further, the processing circuit 15*b* also performs computation processing to determine the tightening torque with reference to the strain. The tightening torque is torque which is produced around the axis 200 and which is applied to the tightening member such as a screw via the tip tool 2 from the anvil 13.

In this way, performing computation by the circuit board 15 enables the tightening torque exerted by the tip tool 2 attached to the anvil 13 to be calculated based on the strain of the anvil 13.

(3) First Variation

In the impact rotary tool 1 in the embodiment described above, the one main surface 102*c* of the second housing 102 is open as shown in FIG. 7A, and the circuit board 15 is directly fixed to the outer surface 101*b* of the first housing 101 by the inner surface 102*d* of the second housing 102. That is, the circuit board 15 in the embodiment is covered with part of the first housing 101 and the second housing 102.

Figure 7B:
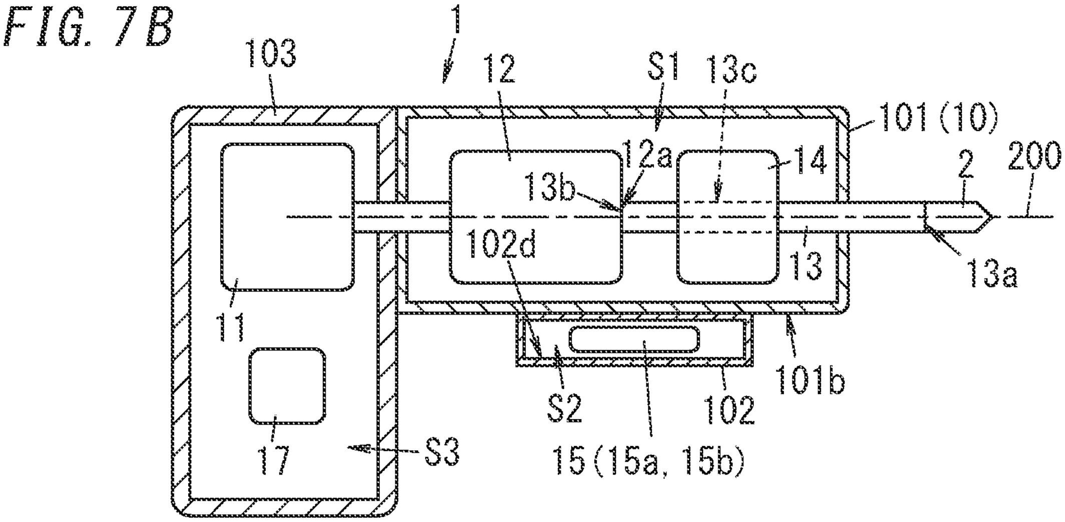
FIG. 7B is a schematic diagram of a first variation of the impact rotary tool.

In contrast, in an impact rotary tool 1 of a first variation, none of surfaces of the second housing 102 is open as shown in FIG. 7B, and the circuit board 15 entirely covered with the second housing is fixed to the outer surface 101*b* of the first housing 101.

In a similar manner to the embodiment, the first variation also provides the effect of preventing abrasion powder from adhering to the circuit board 15.

(4) Second Variation

Figure 7C:
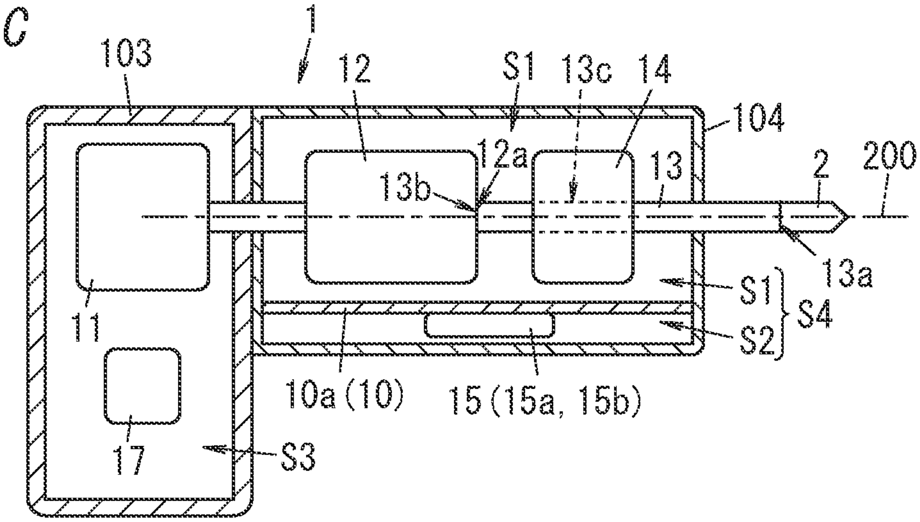
FIG. 7C is a schematic diagram of a second variation of the impact rotary tool.

In an impact rotary tool 1 in a second variation, the isolator 10 is the wall 10*a* as shown in FIG. 7C.

The wall 10*a* separates a space (hereinafter referred to as a fourth space S4) in a fourth housing 104 into the first space S1 and the second space S2. The fourth housing 104 covers the hammer 12, part of the anvil 13 except for its one end (tip end 13*a*) to which the tip tool 2 is to be attached, and the circuit board 15.

In this way, separating the fourth space S4 into the first space S1 and the second space S2 by the wall 10*a* also isolates the contact portions (12*a* and 13*b*) from the circuit board 15 and enables abrasive powder to be suppressed from adhering to the circuit board 15.

(5) Other Variations

In an impact rotary tool 1 in other variations, the second housing 102 further covers the first housing 101 in addition to the circuit board 15.

That is, the most parts of the hammer 12 and the anvil 13, and the sensor 14 in the vicinity of the anvil 13 are covered with the first housing 101, and further, the first housing 101 is, together with the circuit board 15, covered with the second housing 102.

Also in this case, the contact portions (12*a* and 13*b*), which are the sources of abrasive powder, are covered with the first housing 101 and are thus isolated from the circuit board 15, which therefore enables the abrasive powder to be suppressed from adhering to the circuit board 15. Further, the processing circuit 15*b* is doubly covered with the first housing 101 and the second housing 102, which therefore enables the processing circuit 15*b* to be more effectively protected.

(6) Summary

An impact rotary tool (1) of a first aspect includes a motor (11), a hammer (12), an anvil (13), a sensor (14), a circuit board (15), and an isolator (10). The hammer (12) is configured to receive rotational force around an axis (200) from the motor (11) and output striking rotational force. The striking rotational force is obtained by converting part of the rotational force into striking force around the axis (200). The anvil (13) to which a tip tool (2) is to be attached is configured to rotate, together with the tip tool (2), around the axis (200) in response to the striking rotational force received from the hammer (12). The sensor (14) is disposed in a vicinity of the anvil (13) and is configured to sense a change in a state of the anvil (13), the change being according to the striking rotational force. The circuit board (15) is configured to receive a sensing result by the sensor (14). The isolator (10) isolates contact portions (12*a* and 13*b*) of the hammer (12) and the anvil (13) from at least the circuit board (15).

According to this aspect, the contact portions (12*a* and 13*b*), which are sources of abrasive powder, of the hammer (12) and the anvil (13) are isolated from at least the circuit board (15). This enables the abrasive powder to be suppressed from adhering to the circuit board (15).

In an impact rotary tool (1) of a second aspect referring to the first aspect, the isolator (10) includes a housing (101) covering at least the contact portions (12*a* and 13*b*), and the circuit board (15) is disposed outside the housing (101).

According to this aspect, the sources of the abrasive powder are covered with the housing (101) to confine the abrasive powder in the housing (101). This enables the abrasive powder to be suppressed from adhering to the circuit board (15) disposed outside the housing (101).

In an impact rotary tool (1) of a third aspect referring to the second aspect, the circuit board (15) is fixed to an outer surface (101*b*) of the housing (101).

This aspect enables the distance between the sensor (14) and the circuit board (15) to be shortened. For example, when the sensor (14) and the circuit board (15) are connected to each other via a lead line (14*c*), the length of the lead line (14*c*) is shortened. Further, the circuit board (15) on the outer surface (101*b*) of the housing (101) and the sensor (14) in the housing (101) vibrate together in response to the striking rotational force from the hammer (12). This enables tension to be suppressed from being caused at the lead line (14*c*).

In an impact rotary tool (1) of a fourth aspect referring to the third aspect, the housing (101) covers the hammer (12), part of the anvil (13) except for a tip end (13*a*) to which the tip tool (2) is to be attached, and the sensor (14).

According to this aspect, most parts of the hammer (12) and the anvil (13) which are the sources of the abrasive powder, and the sensor (14) in the vicinity of the anvil (13) are covered with the housing (101). This enables the abrasive powder to be suppressed from adhering to the circuit board (15) disposed outside the housing (101) while protecting the most parts of the hammer (12) and the anvil (13), and the sensor (14).

Note that when the circuit board (15) is covered with a cover or the like, the effect of suppressing adhesion of abrasive powder spreads only to the circuit board (15). However, when the sources of the abrasive powder are covered with the housing (101) to be isolated from the circuit board (15) as in this aspect, the effect of suppressing adhesion of abrasive powder usually also spreads to elements (e.g., the control circuit 17) in addition to the circuit board (15). This enables the abrasive powder to be suppressed from adhering to the elements other than the circuit board (15).

In an impact rotary tool (1) of a fifth aspect referring to the fourth aspect, the housing (101) is a first housing (101). The impact rotary tool (1) further includes a second housing (102). The second housing (102) is disposed outside the first housing (101) and covers the circuit board (15).

According to this aspect, the contact portions (12*a* and 13*b*), which are the sources of the abrasive powder, are covered with the first housing (101), and the circuit board (15) is covered with the second housing (102). This enables the abrasive powder to be further effectively suppressed from adhering to the circuit board (15).

In an impact rotary tool (1) of a sixth aspect referring to the fifth aspect, the second housing (102) has one main surface (102*c*) which is open. The second housing (102) is, at a side of the one main surface (102*c*) which is open, fixed to an outer surface (101*b*) of the first housing (101) with the circuit board (15) being housed in the second housing (102). The circuit board (15) is fixed to the first housing (101) by the outer surface (101*b*) of the first housing (101) and an inner surface (102*d*) of the second housing (102).

This aspect enables the second housing (102) to fix the circuit board (15) to the first housing (101) and the abrasive powder to be suppressed from adhering to the circuit board (15).

An impact rotary tool (1) of a seventh aspect referring to the sixth aspect further includes a third housing (103). The third housing (103) is disposed outside the first housing (101) and outside the second housing (102) and covers at least the motor (11).

According to this aspect, the motor (11) and other elements are covered with the third housing (103). This enables abrasion powder produced at the contact portions (12*a* and 13*b*) of the hammer (12) and the anvil (13) to be suppressed from adhering to the motor (11) and other elements. Further, even when abrasive powder is produced, for example, due to friction between a brush and a commutator in the motor (11), this aspect enables the abrasive powder to be suppressed from adhering to the circuit board (15).

In an impact rotary tool (1) of an eighth aspect referring to any one of the first to seventh aspects, the sensor (14) is configured to sense a strain of the anvil (13) and output a signal corresponding to a sensing result. The circuit board (15) includes a processing circuit (15*b*). The processing circuit (15*b*) is configured to perform computation processing to determine tightening torque with reference to the signal output from the sensor (14). The tightening torque is torque which is produced around the axis (200) and which is applied from the anvil (13) to a tightening member via the tip tool (2).

This aspect enables the tightening torques to be calculated based on the strain of the anvils 13.

In an impact rotary tool (1) of a ninth aspect referring to the eighth aspect, the sensor (14) includes a magnetostrictive film (14*a*) and a coil (14*b*). The magnetostrictive film (14*a*) is disposed on at least part of an outer peripheral surface (13*c*) of the anvil (13). The coil (14*b*) surrounds the magnetostrictive film (14*a*). The circuit board (15) further includes an amplifying circuit (15*a*). The amplifying circuit (15*a*) is configured to amplify a voltage signal from the coil (14*b*) and give the voltage signal thus amplified to the processing circuit (15*b*).

This aspect enables the strain of the anvil (13) to be magnetically sensed.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An impact rotary tool comprising:

a motor;

a hammer configured to receive rotational force around an axis from the motor and output striking rotational force obtained by converting part of the rotational force into striking force around the axis;

an anvil to which a tip tool is to be attached, the anvil being configured to rotate, together with the tip tool, around the axis in response to the striking rotational force received from the hammer;

a sensor disposed in a vicinity of the anvil and configured to sense a change in a state of the anvil, the change being according to the striking rotational force;

a circuit board configured to receive a sensing result by the sensor; and an isolator isolating contact portions of the hammer and the anvil from at least the circuit board, wherein the isolator includes a housing covering the contact portions and the sensor, the circuit board is fixed to an outer surface of the housing, and the sensor and the circuit board are connected to each other via a lead line.

2. The impact rotary tool of claim 1, wherein the housing further covers the hammer, and part of the anvil except for a tip end to which the tip tool is to be attached.

3. The impact rotary tool of claim 2, wherein the housing is a first housing, and the impact rotary tool further comprises a second housing disposed outside the first housing and covering the circuit board.

4. An impact rotary tool comprising:

a motor;

a hammer configured to receive rotational force around an axis from the motor and output striking rotational force obtained by converting part of the rotational force into striking force around the axis;

an anvil to which a tip tool is to be attached, the anvil being configured to rotate, together with the tip tool, around the axis in response to the striking rotational force received from the hammer;

a sensor disposed in a vicinity of the anvil and configured to sense a change in a state of the anvil, the change being according to the striking rotational force;

a circuit board configured to receive a sensing result by the sensor; and an isolator isolating contact portions of the hammer and the anvil from at least the circuit board, wherein the second housing has one main surface which is open, the second housing being, at a side of the one main surface which is open, fixed to the outer surface of the first housing with the circuit board being housed in the second housing, and the circuit board is fixed to the first housing by the outer surface of the first housing and an inner surface of the second housing.

5. The impact rotary tool of claim 4, further comprising a third housing disposed outside the first housing and outside the second housing and covering at least the motor.

6. An impact rotary tool comprising:

a motor;

a hammer configured to receive rotational force around an axis from the motor and output striking rotational force obtained by converting part of the rotational force into striking force around the axis;

an anvil to which a tip tool is to be attached, the anvil being configured to rotate, together with the tip tool, around the axis in response to the striking rotational force received from the hammer;

a sensor disposed in a vicinity of the anvil and configured to sense a change in a state of the anvil, the change being according to the striking rotational force;

a circuit board configured to receive a sensing result by the sensor; and an isolator isolating contact portions of the hammer and the anvil from at least the circuit board, wherein the sensor includes:

a magnetostrictive film disposed on at least part of an outer peripheral surface of the anvil, and a coil surrounding the magnetostrictive film, and the circuit board further includes an amplifying circuit configured to amplify a voltage signal from the coil and give the voltage signal thus amplified to the processing circuit.

* * * * *